United States Patent [19]
Takahashi

[11] Patent Number: 5,635,951
[45] Date of Patent: Jun. 3, 1997

[54] DISPLAY SYSTEM WITH IMAGE MAGNIFICATION CAPABILITY

[75] Inventor: Yoshitaka Takahashi, Tokyo, Japan

[73] Assignee: NEC Corporation, Tokyo, Japan

[21] Appl. No.: 462,290

[22] Filed: Jun. 5, 1995

Related U.S. Application Data

[63] Continuation of Ser. No. 35,696, Mar. 23, 1993, abandoned.

[30] Foreign Application Priority Data

Mar. 27, 1992 [JP] Japan ................................. 4-071025

[51] Int. Cl.$^6$ ................................................. G09G 5/26
[52] U.S. Cl. .......................... 345/127; 345/131; 345/156
[58] Field of Search ............................ 345/127–131, 345/158, 168, 9, 156; 367/7

[56] References Cited

U.S. PATENT DOCUMENTS

| | | | |
|---|---|---|---|
| 4,814,552 | 3/1989 | Stefik et al. | 345/183 |
| 4,837,749 | 6/1989 | Nakajima | 345/127 |
| 5,122,789 | 6/1992 | Ito | 345/130 |
| 5,142,506 | 8/1992 | Edwards | 367/7 |
| 5,252,950 | 10/1993 | Saunders et al. | 345/9 |

FOREIGN PATENT DOCUMENTS

| | | |
|---|---|---|
| 01277286 | 11/1989 | Japan . |
| 3-189683 | 8/1991 | Japan . |
| 2186374 | 6/1992 | Japan . |

OTHER PUBLICATIONS

Foley et al, Computer Graphics Principles and Practice, 2nd edition, 1990, Addison–Wesley Pub., pp. 253–258.

Bagheri, et al.; "TA 5.3: 11.6GHz 1:4 Demultiplexer with Bit Rotation Control and 6.1GHz Auto–Latching Phase Aligner ICs", IEEE Int. Solid State Circuits Conference, 1992; pp. 94–95.

*Primary Examiner*—Steven Saras
*Attorney, Agent, or Firm*—Sughrue, Mion, Zinn, Macpeak & Seas

[57] ABSTRACT

A display system includes a display unit provided with a screen for displaying images and an input unit for entering information. The display unit and the input unit include an infrared rays emitting section for emitting infrared rays and an infrared rays receiving section for receiving the infrared rays, respectively. The system further comprises a measuring section and a timer section. These sections measure the time which the infrared rays take to travel from the infrared rays emitting section to the infrared rays receiving section, and translate the time into the distance between the input unit and display unit. A magnifying section determines a magnification rate on the basis of the distance and a standard distance, generates a magnified image by, on the basis of the magnification rate, magnifying part of an image the entire of which is to be displayed on the screen in the case of the standard distance, and makes the display unit display the magnified image on the screen.

8 Claims, 5 Drawing Sheets

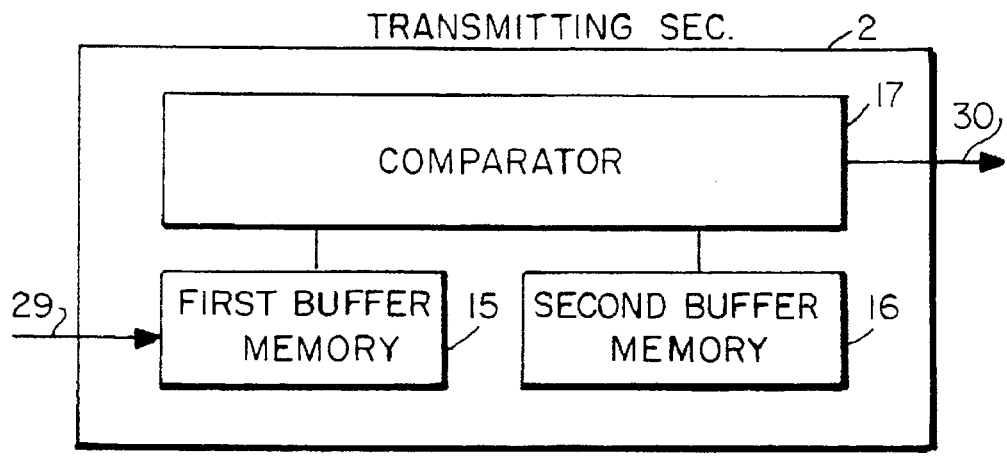
FIG.2
FIG.3
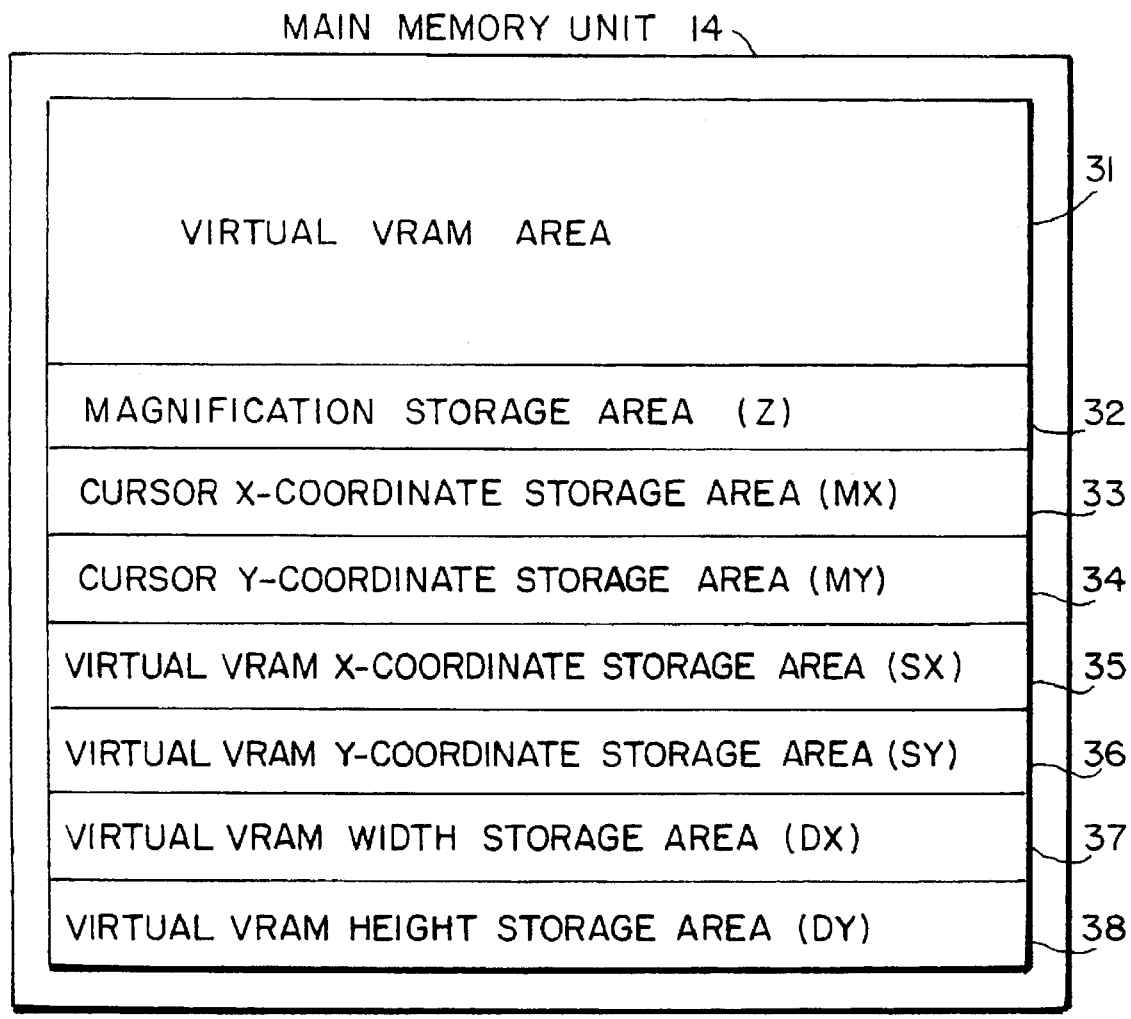

DISPLAY SYSTEM WITH IMAGE MAGNIFICATION CAPABILITY

This is a continuation of application Ser. No. 08/035,696 filed Mar. 23, 1993 is now abandoned.

BACKGROUND OF THE INVENTION

The invention relates to a display system with image magnification capability.

A prior art information processing system comprises an input unit such as a keyboard or a mouse device and a display unit as peripheral units. In the system, the size of characters and a cursor displayed on the screen of the display unit is fixed, regardless of the distance between the input unit and the display unit. As a result, the system has a disadvantage in that when the display unit is far away from the input unit at which the user is performing input operations, it is difficult for the user to perform these input operations via the input unit, because it is hard for the user to look at small-size characters on the screen of the display unit.

SUMMARY OF THE INVENTION

An object of the invention is, therefore, to provide a display system free from the above-mentioned disadvantage.

According to an aspect of the invention, a display system is provided in which the distance from an input unit to a display unit is measured and images displayed on the display unit are magnified accordingly.

The display system has a display unit provided with a screen for displaying images, an input unit for entering information and a measuring unit for measuring the distance between the display unit and the input unit. The system further includes a magnifying unit for determining a magnification rate on the basis of the measured distance and a standard distance, generating a magnified image by, on the basis of the magnification rate, magnifying part of an image the entire of which is to be displayed on the screen in the case of the standard distance, and making the display unit display the magnified image on the screen.

BRIEF DESCRIPTION OF THE DRAWINGS

Other features and advantages of the invention will become apparent from the following detailed description when taken in conjunction with the accompanying drawings, in which:

FIG. 2 is a block diagram of a transmitting section used in the invention;

FIG. 3 shows a memory map illustrating the contents of a main memory unit used in the invention;

In the drawings, the same reference numerals represent the same structural elements.

DETAILED DESCRIPTION OF THE PREFERRED EMBODIMENT OF THE INVENTION

Description will next be made in detail of a preferred embodiment of the invention.

Figure 1:
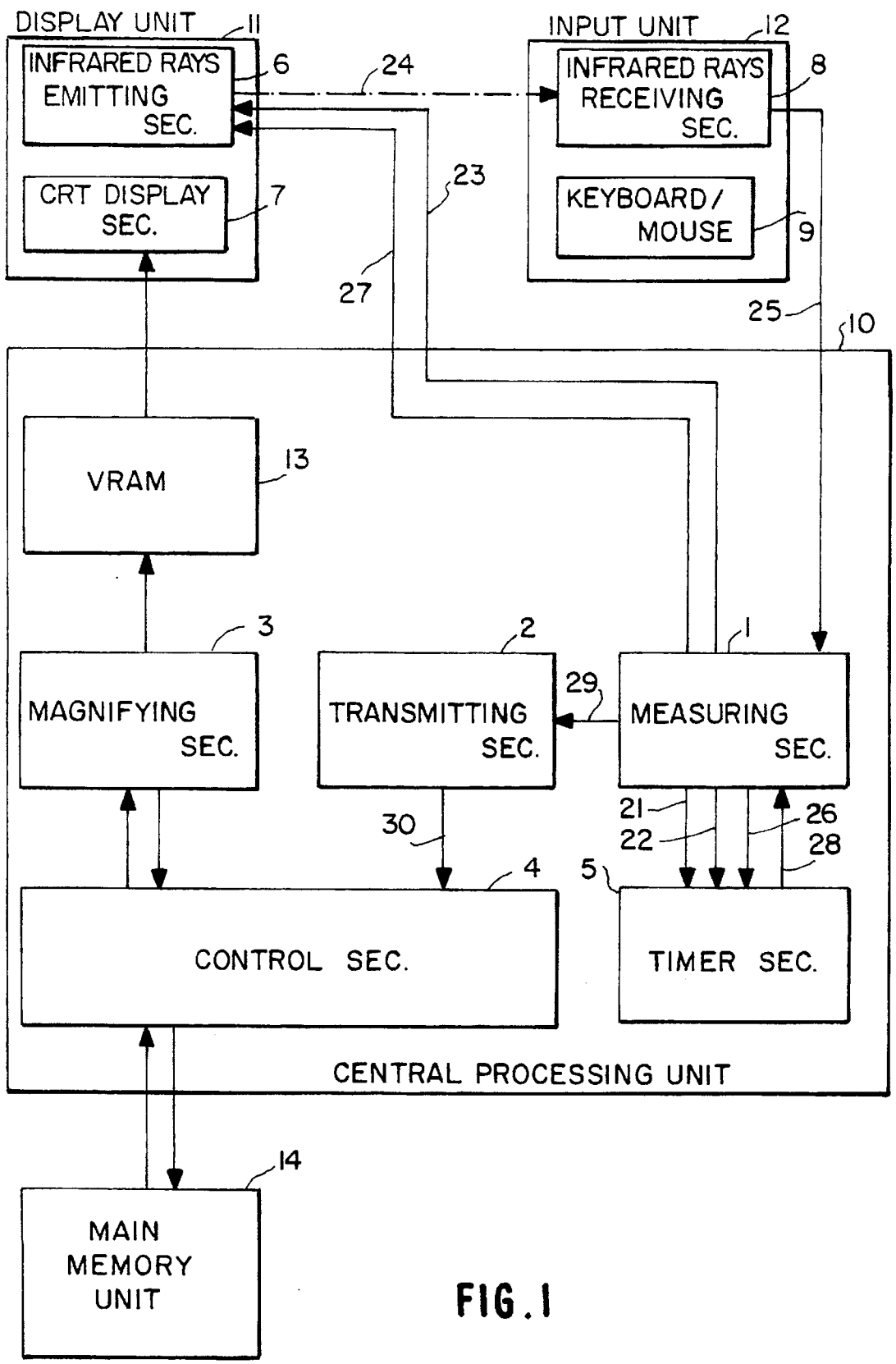
FIG. 1 is a block diagram of a preferred embodiment of the invention.

Referring to FIG. 1, a display system includes a central processing unit 10 such as a personal computer, a display unit 11, an input unit 12, and a main memory unit 14.

The display unit 11 includes a CRT (cathode ray tube) display section 7 for displaying characters, a cursor and so on, and an infrared rays emitting section 6 for emitting infrared rays 24.

The input unit 12 includes a keyboard or mouse 9, and an infrared rays receiving section 8 for receiving the infrared rays 24 emitted by the section 6.

The central processing unit 10 includes a measuring section 1, a transmitting section 2, a magnifying section 3, a control section 4, a timer section 5, and a video random access memory (VRAM) 13 which holds picture element data corresponding to an image to be displayed on the screen of the display section 7. Each of the picture element data corresponds to a picture element on the screen. The measuring section 1 measures the time which the infrared rays 24 take to travel from the section 6 to the section 8, and translates the time into the distance between the sections 6 and 8 to send to the transmitting section 2 as a distance value. The section 2 compares the distance value from the section 1 with a distance value previously held in the section 2. If the value from the section 1 differs from the distance value previously held in the section 2, indicating that the input unit 12 or the display unit 11 has moved to a new position, the section 2 sends the distance value from the section 1 and an interrupt signal through lines 30 to the control section 4. In response to the interrupt signal, the section 4 transfers the distance value to the magnifying section 3. The section 3 calculates the optimum magnification on the basis of the distance value as hereafter described in detail. The section 3 may be implemented by software or hardware. The control section 4 may be an off-the-shelf microprocessor and performs overall control in the unit 10.

Description will next be made of the operation of the embodiment in more detail.

The measurement of the distance between the display unit 11 and the input unit 12 is performed as follows:

The measuring section 1 sends a timer reset signal via a line 21 to the timer section 5 to reset it. Then, the section 1 sends a timer start signal via a line 22 to the section 5 to start it. At the same time, the section 1 gives an emission start signal via a line 23 to the infrared rays emitting section 6 to activate it. On arrival of the emission start signal, the section 6 begins emitting the infrared rays 24 toward the infrared rays receiving section 8. As soon as it receives the rays 24, the section 8 sends a reception signal through a line 25 to the measuring section 1. On arrival of the reception signal, the section 1 transmits a timer halt signal and an emission halt signal via a line 26 and a line 27 to the timer section 5 and the infrared rays emitting section 6, respectively, to halt them. Next, the measuring section 1 fetches the measured time from the timer section 5 via line 28 and translates it into a distance value to be transferred via a line 29 to the transmitting section 2.

As shown in FIG. 2, the transmitting section 2 has a comparator 17, a first buffer memory 15 and a second buffer memory 16 which holds a distance value previously measured. The section 2 stores the distance value just transferred from the measuring section 1 into the first buffer memory 15. The comparator 17 compares the value in the memory 15 with the value in the memory 16. If the values are different from each other, thus indicating that the input unit 12 or the display unit 11 has moved to a new position, the comparator 17 stores the value in the memory 15 into the memory 16 and sends an interrupt signal and the distance value in the memory 15 via the line 30 to the control section 4 which then transfers the distance value to the magnifying section 3.

Figure 4:
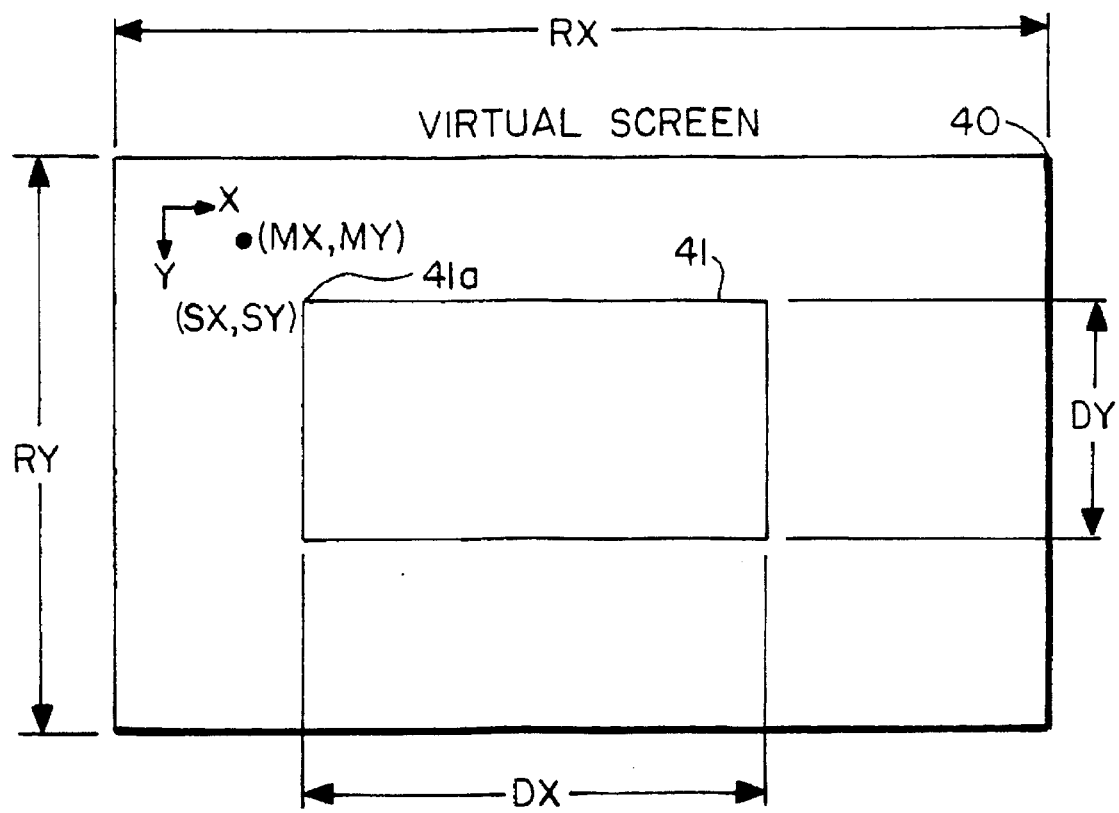
FIG. 4 shows a schematic view of a virtual screen.

Referring to FIGS. 3 and 4, the main memory unit 14 includes a virtual VRAM area 31 holding picture element data corresponding to an image on a virtual screen 40 which is the same size as the real screen of the display section 7, a magnification storage area 32 for storing a magnification value (Z), a cursor X-coordinate storage area 33 for storing the X-coordinate value (MX) of the cursor on the screen of the section 7, a cursor Y-coordinate storage area 34 for storing the Y-coordinate value (MY) of the cursor, a virtual VRAM X-coordinate storage area 35 for storing the X-coordinate value (SX) of a starting point 41a on the virtual screen 40 at which displaying is to begin on the real screen of the section 7, a virtual VRAM Y-coordinate storage area 36 for storing the Y-coordinate value (SY) of the starting point 41a on the virtual screen 40 at which displaying is to begin on the real screen of the section 7, a virtual VRAM width storage area 37 for storing the width value (DX) of an area 41 on the virtual screen 40 to be displayed on the real screen of the section 7, and a virtual VRAM width storage area 38 for storing the height value (DY) of the area 41 to be displayed on the real screen of the section 7. The area 31 holds picture element data corresponding to an image to be displayed on the screen of the display section 7 where the distance between the input unit 12 and the display unit 11 is a standard distance. The width value (DX) and the height value (DY) are represented in the form of a number of picture elements on the virtual screen. The areas 31 through 38 are all initialized to zero in advance.

Receiving the distance value from the control section 4, the magnifying section 3 calculates the magnification value (Z) by dividing the distance value by a standard distance value which may be changed at the users' will. If the result of the division is more than one, the section 3 stores the result of the division into the area 32. Otherwise, the section 3 stores one (1) into the area 32. That is, if the result of division equals "one" (1), then the input unit 12 is located at a standard distance from the display unit 11 and thus there is no need for any magnification to occur. If the result of division is less than "one" (1), then the input unit 12 is closer to the display unit 11 than the standard distance, and thus there is no need for magnification.

The section 3 next calculates the width value (DX) and the height value (DY) by dividing the width value (RX) and the height value (RY) of the screen of the section 7 (which are represented in the form of a number of picture elements) by the value (Z), respectively. The calculated values (DX) and (DY) are stored in the areas 37 and 38, respectively.

The magnifying section 3 then stores the X-coordinate value (MX) and the Y-coordinate value (MY) of the present position of the cursor on the screen of the section 7 into the areas 33 and 34, respectively, and performs the following processing.

(1) if the value (MX)<the value (SX), where (SX) is the previous X-coordinate value of a starting point 41a on the virtual screen 40, store the value (MX) into the area 35 (see FIG. 4).

(2) if the value (MX)>a value (SX+DX), store a value (MX−DX) into the area 35.

(3) if the value (MY)<the value (SY), store the value (MY) into the area 36 (see FIG. 4).

(4) if the value (MY)>a value (SY+DY), store a value (MY−DY) into the area 36.

Figure 5:
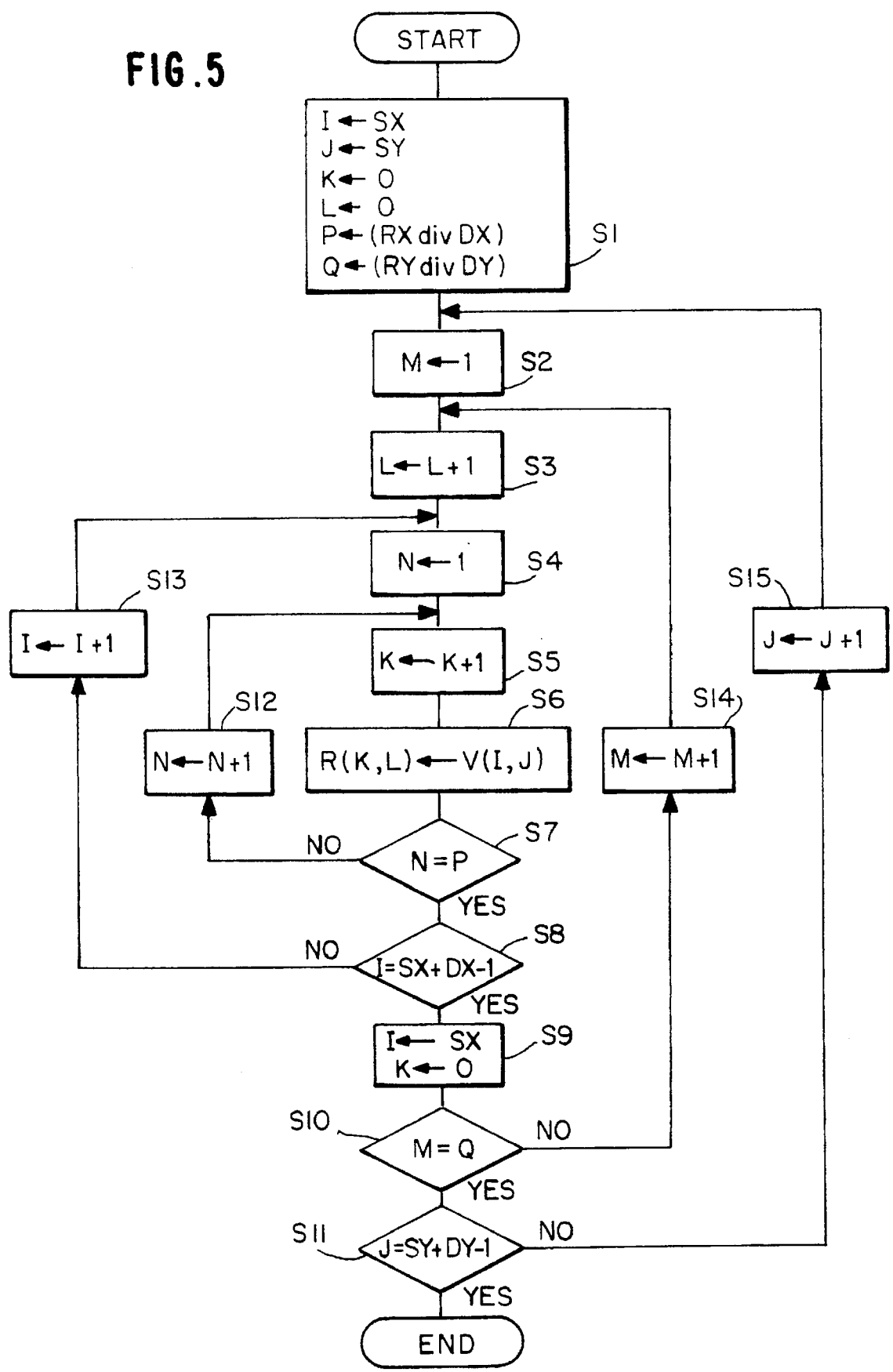
FIG. 5 is a flow diagram of a magnification processing operation.

The section 3 further performs a magnification processing shown in FIG. 5. First, the values (SX) and (SY) are substituted for variables I and J, a value "0", for both variables K and L, a value (RX div DX), for a variable P and a value (RY div DY), for a variable Q. (step S1) The value (RX div DX) means a maximum integer value which does not exceed a value obtained by dividing the value (RX) by the value (DX). Likewise, the value (RY div DY) means a maximum integer value which does not exceed a value obtained by dividing the value (RY) by the value (DY). Then, a value "1" is substituted for a variable M (step S2), a value (L+1), for the variable L (step S3), a value "1" for a variable N (step S4), and a value (K+1), for the variable K (step S5).

Next, the content of a location V(I,J) in the area 31 addressed by the contents of the variables I and J which indicate an X-coordinate value and a Y-coordinate value the area 41 of the virtual screen 40 is transferred to a location R(K,L) in the VRAM 13 addressed by the contents of the variables K and L which indicate an X-coordinate value and a Y-coordinate value of a corresponding point on the real screen of the display section 7. (step S6). Then, the content of the variable N is compared with the content of the variable P (step S7), and, if N≠P, the value of the variable N is incremented by one (1) (step S12). Thereafter, the steps S5, S6, S7 and S12 are repeated until the content of the variable N becomes equal to the content of the variable P. This means that a picture element on the area 41 of the virtual screen 40 is magnified in the X-coordinate direction on the real screen by a value indicated by the content of the variable P. That is, a picture element in the area 41 is repeated P times in the VRAM 13, thus creating a magnification effect.

At the step S7, when the contents of the variables N and P become equal, the content of the variable I is compared with a value (SX+DX−1). (step S8). If the content of the variable I is not equal to the value (SX+DX−1), a value (I+1) is substituted for the variable I. (step S13). Thereafter, the steps S4 through S8, S12 and S13 are repeated.

At the step S8, if the content of the variable I is equal to the value (SX+DX−1) which indicates the X-coordinate value of the rightmost picture elements on the area 41 of the screen 40, the value (SX) and the value "0" are substituted for the variables I and K, respectively (step S9). Next, the contents of the variables M and Q are compared (step 10), and, if they are not equal, the variable M is incremented by one (1) (step S14). Thereafter, the steps S3 to S10 and S12 to S14 are repeated until the contents of the variables M and Q become equal. This means that picture elements on the area 41 of the virtual screen 40 are magnified in the Y-coordinate direction on the real screen by a value indicated by the content of the variable Q. That is, a picture element in the area 41 is repeated Q times in the VRAM 13 thus creating a magnification effect.

At the step S10, when the contents of the variables M and Q are equal, the content of the variable J is compared with a value (SY+DY−1). (step S11). If the content of the variable J is not equal to the value (SY+DY−1), the variable J is incremented by one (1) (step S15). Thereafter, the steps S2 to S15 are repeated.

At the step S11, if the content of the variable J is equal to the value (SY+DY−1) which indicates the Y-coordinate value of the lowermost picture elements on the area 41 of the screen 40, the magnification processing is completed.

Figure 6A:
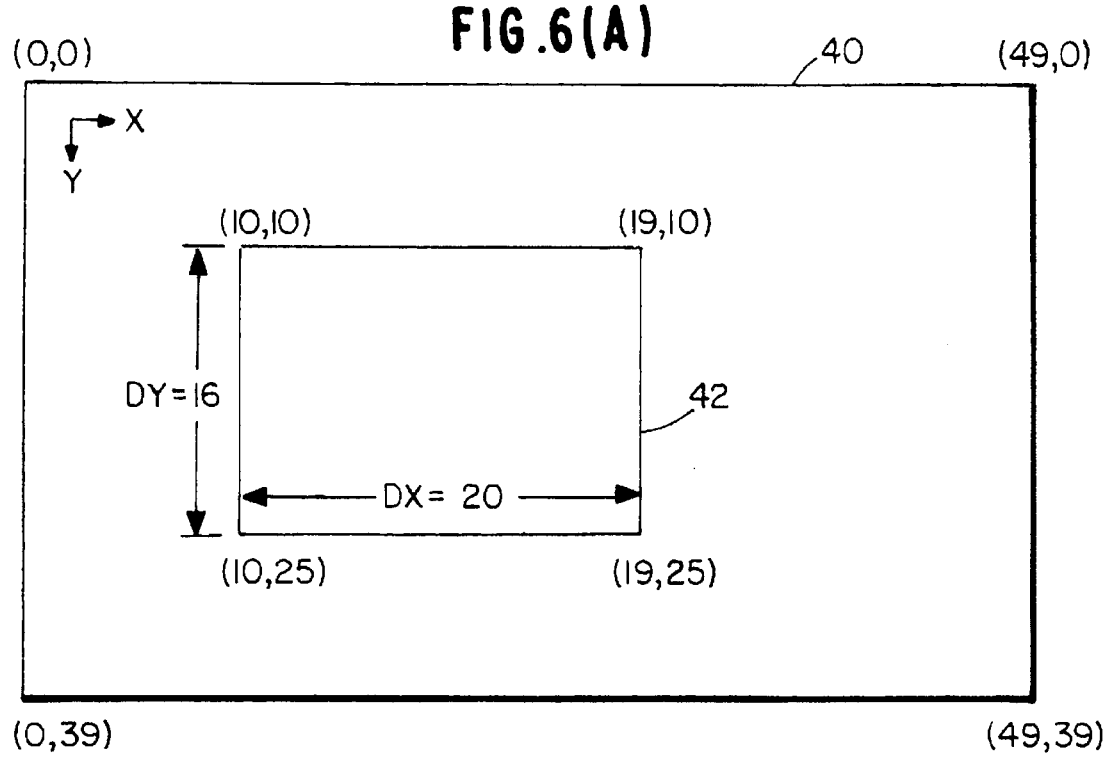
FIGS. 6A and 6B show schematic views illustrating an example of a magnification operation.
Figure 6B:
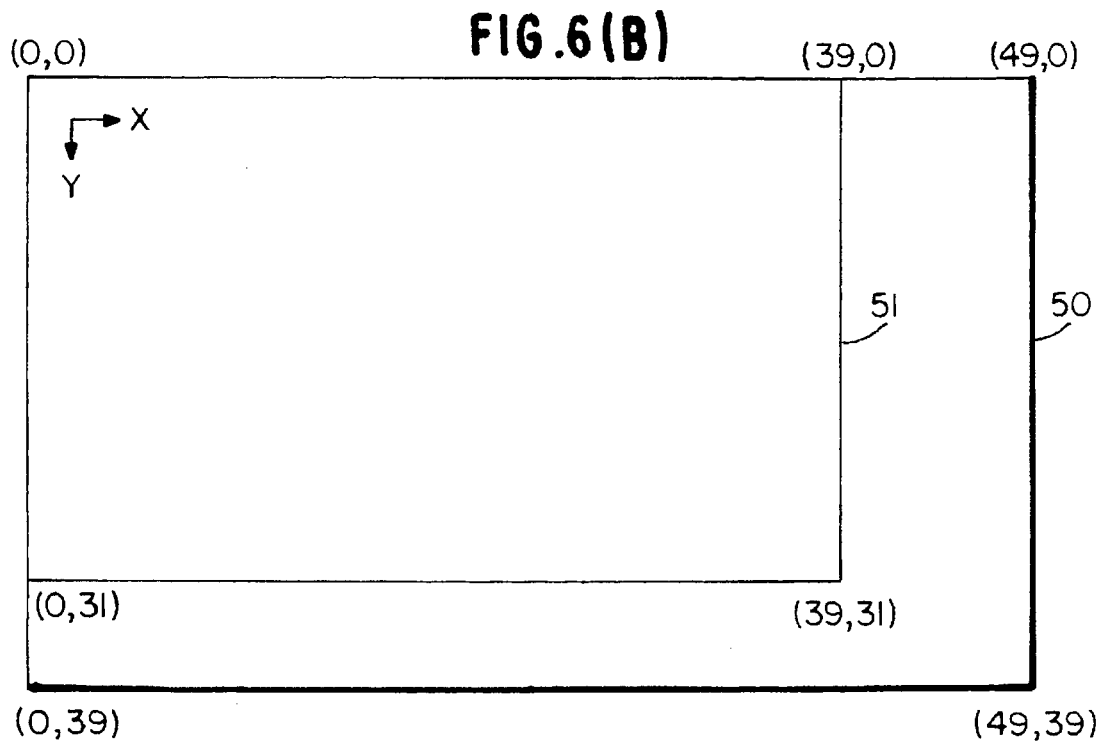

For instance, assuming that (Z)=2.5, (RX)=50, (RY)=40, (MX)=10 and (MY)=10, then (DX)=20, (DY)=16, (SX)=10, (SY)=10, (RX div DX)=2 and (RY div DY)=2. In this case, an area 42 on the virtual screen 40 (see FIG. 6A) is magnified on the real screen 50 as an area 51 (see FIG. 6B).

That is, in the flow chart of FIG. 5, at step S1, the variable I gets the value 10 and the variable J gets the value 10. The variables K and L are set to zero (0). The variables P and Q each get the value 2. At step S2 the variable M gets the value 1. At step S3 L is incremented from 0 to 1. At step S4 the variable N is assigned the value 1. At step S5 the value K is incremented to 1. At step S6, the picture element located in virtual VRAM area 31 at storage location (10,10) is transferred to a storage location (1,1) in VRAM 13. Since P=2, the picture element located in virtual VRAM area 31 at storage location (10,10) is also transferred to a storage location (2,1) in VRAM 13 by steps S6, S7, S12, and S5. The remainder of the flowchart proceeds in a similar fashion to magnify the portion 42 when it is displayed as area 51 on real screen 50.

Furthermore, an additional magnification processing may be made to fill the area on the right side of the area 51 and the area below the area 51. This processing comprises the calculation of a value SSX as follows. First, a first value (RX div DX) is calculated. Then the first value is multiplied by DX to obtain a second value. Then, (RX mod DX) is calculated to obtain a third value. Then the operation (second value) div (third value) is carried out to obtain a value SSX. A value SSY is obtained in an analogous fashion. The value (RX mod DX) means the remainder obtained when the value (RX) is divided by the value (DY). Likewise, the value (RY mod DY) means the remainder obtained when the value (RY) is divided by the value (DY). Then, when picture element data corresponding to the area 51 are read out of the VRAM 13 and sent to the display section 7, the picture elements in the area 51 located at each SSX-th X-coordinate are repeated in the X-coordinate direction and the picture elements located at each SSY-th Y-coordinate are repeated in the Y-coordinate direction. That is, in the example above, SSX=4, so each 4th coordinate in the X direction is repeated. So, from the VRAM 13, the sequence of X coordinate data being sent to be displayed on the real screen 50 is as follows: 1, 2, 3, 4, 4, 5, 6, 7, 8, 8 . . . SSY in the example above is also equal to 4 so the same sequence above, 1, 2, 3, 4, 4, 5, 6, 7, 8, 8 . . . also applies for the Y coordinates.

In the embodiment, although the infrared rays emitting section 6 is installed in the display unit 11 and the infrared rays receiving section 8 is installed in the input unit 12, the combination may be reversed, i.e. a construction in which the display unit 11 is provided with an infrared rays receiving section and the input unit 12 is provided with an infrared rays emitting section.

What is claimed is:

1. A display system comprising:

a display unit provided with a screen for displaying images;

an input unit for entering information;

measuring means for measuring the distance between said display unit and said input unit;

a memory for storing a previously measured distance between said display and input units;

a comparator for comparing a currently measured distance to the distance in said memory means and sending said currently measured distance to a magnifying means only when said currently measured distance differs from the distance in said memory; and said magnifying means determining a magnification rate by dividing said measured distance by a standard distance, and using said magnification rate to magnify a displayed image whenever said measured distance is increased with respect to said standard distance.

2. A display system as claimed in claim 1, wherein said measuring means includes time measurement means for measuring the time in which infrared rays take to travel between said display unit and said input unit and translating said time into said distance between said display unit and said input unit.

3. A display system as claimed in claim 2, wherein said time measurement means includes:

activating means for causing infrared rays to be emitted;

halt means for halting said activate means once said rays have finished travelling between said input unit and said display unit; and timer means which starts a time measuring operation when said activate means starts causing infrared rays to be emitted and stops said measuring means when said halt means halts said activation means.

4. A display system claimed in claim 1, further comprising:

a real storage means for holding only picture element data corresponding to said magnified image to be displayed on said screen;

a virtual storage means for holding picture element data corresponding to an image from which said magnified image is derived;

determining means for determining on the basis of said magnification rate which area of said image corresponding to said picture element data stored in said virtual storage means should be magnified;

copying means for copying each of the picture element data in said virtual storage means corresponding to said area to be magnified, by a number of times decided in accordance with said magnification rate, into said real storage means; and filling means, operative when the number of picture element data stored in said real storage means is less than the number of pixels of said screen, for assigning data to pixels not having assigned a picture element data from said real storage means.

5. The display system of claim 4, wherein said filling means for filling a remaining area of said screen not filled by picture element data from said real storage means calculates an X-remainder value and causes every picture element corresponding to an X-remainder multiple distance on each horizontal line to be repeated, and calculates a Y-remainder value and causes every picture element corresponding to Y-remainder multiple distance in each vertical column to be repeated.

6. A method of displaying a magnified image on a display unit comprising steps of:

measuring the distance between an input unit and said display unit;

comparing said measured distance to a previously measured distance;

comparing said measured distance with a predetermined standard distance when said measured distance differs from said previously measured distance; and displaying a previously displayed image on said screen in magnified form when said measured distance increases with respect to said standard distance, with a magnification rate based on the results of said measuring step.

7. The method of claim 6 in which said measuring step involves detecting a time period in which infrared rays travel between said display unit and said input unit.

8. The method of claim 6 in which said displaying step displays a magnified image by repeating each picture element a predetermined number of times, said predetermined number based on the results of said measuring step.

* * * * *